United States Patent [19]

Groves et al.

[11] 4,423,494

[45] Dec. 27, 1983

[54] BEAM STEERABLE SONAR ARRAY

[75] Inventors: Kenneth W. Groves, Forest Hills; John D. Lea, Huntington, both of N.Y.

[73] Assignee: Sperry Corporation, New York, N.Y.

[21] Appl. No.: 303,693

[22] Filed: Sep. 21, 1981

[51] Int. Cl.[3] .......................... G01S 3/80; G10K 11/34

[52] U.S. Cl. ...................................... 367/123; 367/103

[58] Field of Search ................................ 367/103, 123

[56] References Cited

U.S. PATENT DOCUMENTS 3,037,185 5/1962 Dewitz ............................... 367/103

*Primary Examiner*—Richard A. Farley

*Attorney, Agent, or Firm*—Howard P. Terry; Seymour Levine

[57] ABSTRACT

A sonar array wherein the capacitance associated with the hydrophones of the array are utilized as shunt elements in an artificial transmission line in order to form an acoustic beam. Series inductance elements to the transmission line are variable with d.c. current flowing through coils wound about a magnetic core about which coils forming the series inductance of the line are also wound, thus permitting the sonar beam to be steered to any desired position.

9 Claims, 5 Drawing Figures

BEAM STEERABLE SONAR ARRAY

BACKGROUND OF THE INVENTION

1. Field of the Invention

The invention pertains to sonar arrays and more particularly to sonar arrays that form beams steerable in two dimensions.

2. Description of the Prior Art

Two dimensional beam steering in sonar systems requires the insertion of variable time delay elements between hydrophones in each vertical array for vertical plane beam steering and variable time delay elements between the vertical line arrays for horizontal plane beam steering. An approach employed in the prior art utilizes a cable for each hydrophone element, runs each cable through the hull of the ship, and processes all signals, received through these cables, in a beam former to provide the necessary delays for both horizontal and vertical plane steering. Since sonar systems may utilize in the order of 1,000 hydrophone elements, even with groupings of conductors into multi-conductor cables, excessive hull penetrations, numerous front end analog channels, and a beam former of considerable complexity are required. Significant simplification is realized by operating the system at a fixed depression angle, for which fixed time delays are inserted between elements in a vertical column. The signals from the elements in each column are summed to form substantially equal vertical beams. The signals at the column output terminals may then be processed to perform the desired beam steering in the bearing plane. This method accomplishes considerable reduction in system complexity at the sacrifice of sonar beam and system flexibilities.

SUMMARY OF THE INVENTION

A beam steerable sonar array in accordance with the present invention utilizes an artificial transmission line with a variable propagation velocity thereon. This transmission line is formed by introducing variable series inductances between the hydrophones of the sonar array as the series distributed inductance of the transmission line while the capacitance of the hydrophones serve as the distributed shunt capacitances of the line. Each coil is wrapped around an iron core in which the saturation flux density is altered by a variable applied d.c. current thereby altering the small a.c. signal inductance of the transmission line series inductor. Since the propagation velocity along the transmission line is a function of the reciprocal of the square root of the product of the series inductance and the shunt capacitor, a change in the value of the series inductance establishes a propagation velocity change along the transmission line and a concomitant shift in the beam position in the plane of the hydrophone elements that are included in the transmission line. Transmission characteristic impedance variations, determined by the square root of the ratio of the series inductance to the shunt capacitance, are tracked by a current variable resistor coupled in series with the d.c. current circuit. Thus, acoustic signals received by the hydrophones in the array are converted to electrical signals and coupled to an artificial transmission line to form a beam at an angle determined by the applied d.c. current about the iron core of the transmission lines series inductances.

DESCRIPTION OF THE PREFERRED EMBODIMENT

In a classic sonar array, groups of hydrophone elements are combined, in series or in parallel, to form a line hydrophone. Each line hydrophone receives acoustic signals and couples electrical signals representative thereof to a transmission line for propagation therealong through the hull of a ship for processing. These electrical signals are amplified and coupled through isolation resistors to a delay line comprising series inductors and shunt capacitors having values chosen to provide delays between signals, coupled from the line hydrophones, to form a beam at a desired bearing. The absence of substantial phase delays between the hydrophone elements within each line hydrophone establishes a beam at a depression angle of zero degrees. The beam forming may be performed digitally rather than by the analog technique described above. Either processing technique may be implemented to vary the delays between the line hydrophone signals to provide a beam scannable in the bearing plane, but at a fixed zero degree depression angle.

Figure 1:
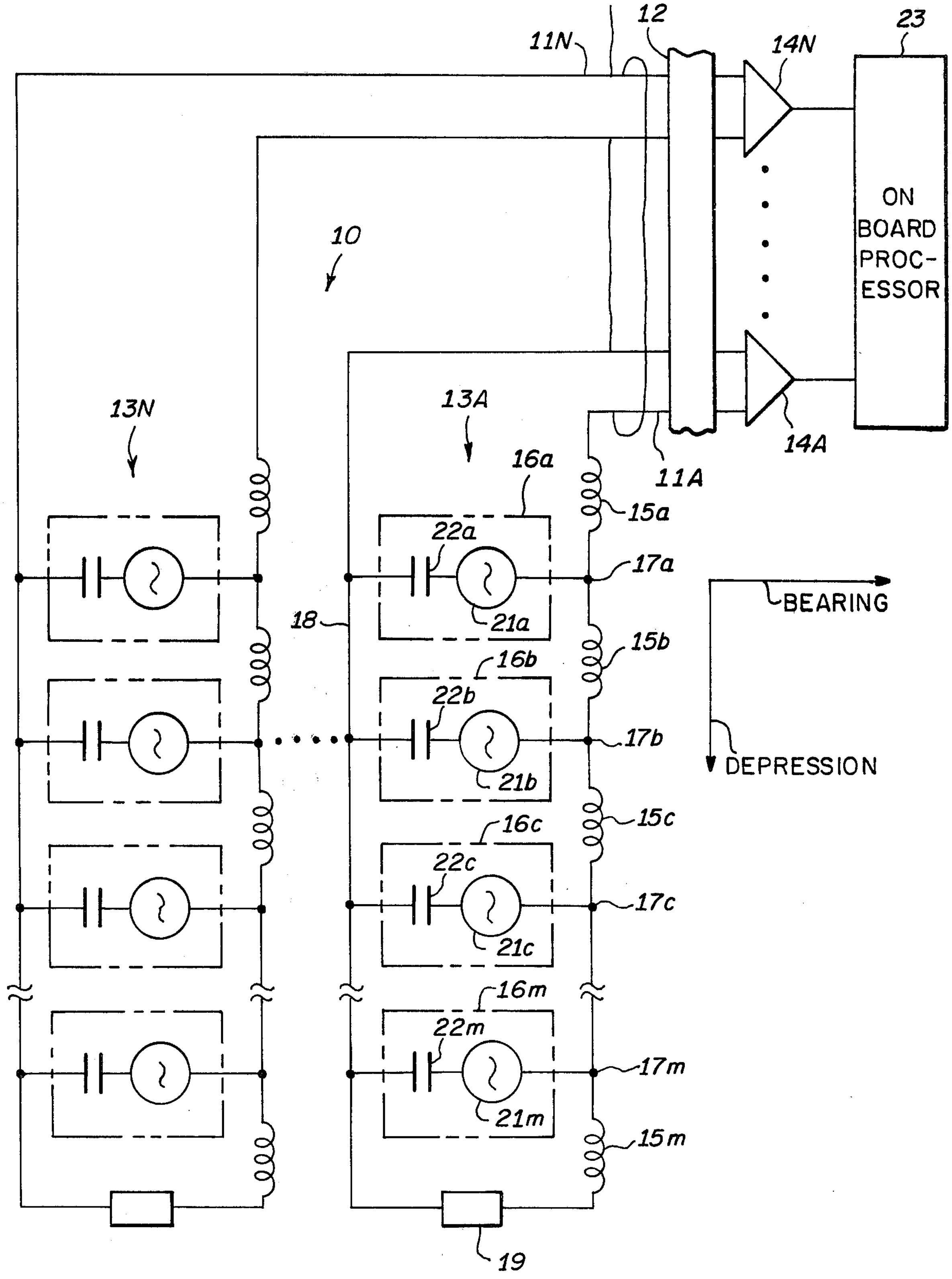
FIG. 1 is a schematic diagram of a sonar planar array utilizing the principles of the present invention.

It is well known to those skilled in the art that a hydrophone element may be represented as a signal source in series with a capacitor. This characteristic may be utilized to establish a hydrophone array that provides a beam steerable in bearing and depression angles. Refer now to FIG. 1 wherein a hydrophone array 10 capable of forming a beam steerable in the bearing plane, at a fixed depression angle other than zero, is shown. A plurality of transmission lines 11A through 11N penetrate the hull 12 of a ship to couple a plurality of artificial transmission lines 13A through 13N respectively to amplifiers 14A through 14N. Each artificial transmission line comprises a plurality of series conductors 15*a* through 15*n* all having an inductance value substantially equal to L, except elements 15*a* and 15*n* which have inductance values substantially equal to $\frac{1}{2}$. Hydrophone elements 16*a* through 16*m* are shunted from the inter-inductance nodes 17*a* through 17*m* to a common conductor 18. The hydrophones 16*a* through 16*m* may be respectively represented by series connected circuits having respectively signal generators 21*a* through 21*m* and capacitors 22*a* through 22*m*. Since the generators 16*a* through 16*m* have substantially zero internal impedance, the circuits 13A through 13N form substantially lossless artificial transmission lines having phase constant $\beta$ per unit length and characteristic impedance $Z_o$ substantially given by:

$$\sin \beta/2 = \frac{W}{2}\sqrt{LC}$$

$$Z_o = \sqrt{\frac{L}{C}\left(1 - \frac{W^2LC}{4}\right)}$$

where w is the electrical radian frequency. Each of the circuits 13A through 13N may be terminated with termination impedances 19 and inserted substantially vertically in the water and form a beam in the depression plane at an angle $\theta_o$ determined by:

$$\theta_o = \sin^{-1}\frac{\beta}{k}$$

where k is the propagation phase constant of the acoustic wave in the water and $\beta$ is the propagation phase constant of the electrical signal along the transmission line.

The amplified signals of the artificial lines 13A through 13N are coupled from the amplifiers 14A through 14N to an onboard processor 23, which may be either digital or analog, wherein signal processing form beams over a desired bearing scan range.

Figure 2:
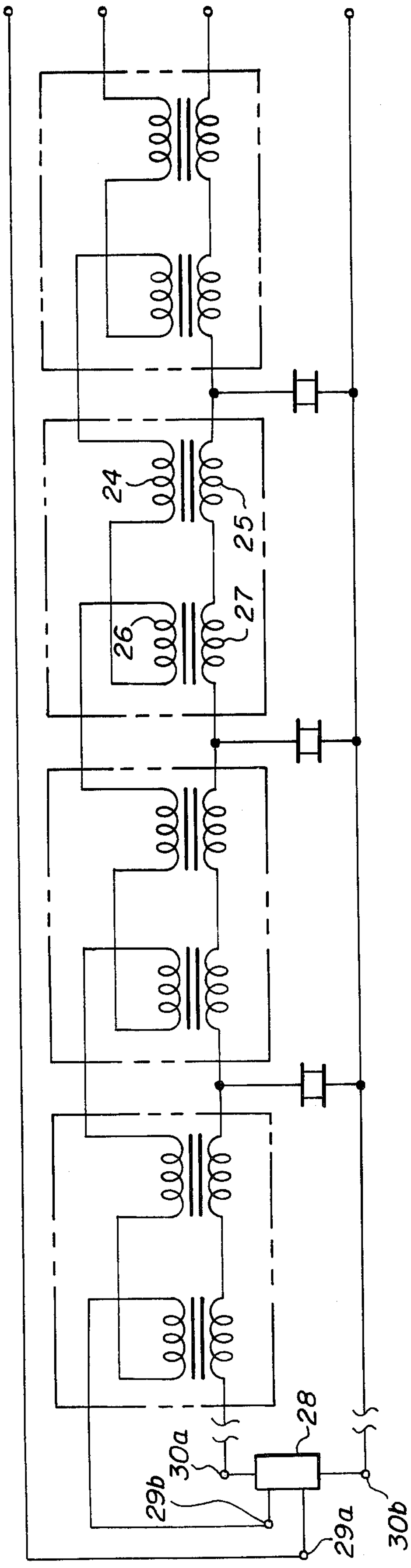
FIG. 2 is a schematic diagram of an artificial transmission line with variable propagation velocity and a characteristic impedance tracking termination.

As stated above, the velocity of propagation along the artificial transmission line is a function of the product of the series inductance and the shunt capacitance. The capacitance, being intrinsic to the hydrophone, is immutable after the line has been constructed. A variable series inductance, however, may be realized by utilizing a coil wrapped about an iron core. With this configuration, small signal inductance may be changed altering the saturation flux density with a d.c. current flowing through the coil or through an additional coil wound about the core. The former configuration requires d.c. current of substantial purity, since ripple on the d.c. current will appear to a sonar system as a received acoustic signal. Additionally, great care must be exercised in grounding the power supply to avoid the formation of ground loops. The latter configuration alleviates the grounding problem, but, due to transformer action, the ripple problem remains unless balanced and opposing windings are used as illustrated schematically in FIG. 2. Half the d.c. winding in a series section, as for example coil 24, is wound about the core in a coupling relationship with half the series coil of the artificial transmission line, as for example the coil 25, while the second half of the d.c. winding in a section, such as the coil 26 is oppositely wound about the core in a coupling relationship with the second half of the section inductance such as the coil 27. First and second halves of the d.c. current coil are coupled as shown in the figure such that the current in both halves flows about the core in the same direction, thus reinforcing the d.c. flux density within the core. Since the two halves of the d.c. coil within each section are oppositely wound about the series inductance in that section two transformers are formed with substantially equal coupling but opposite a.c. polarity. Thus the ripple on the d.c. current is cancelled within each section of the artificial transmission line. This line may be terminated by a current variable impedance 28 having terminals 30*a*, 30*b* coupled to the end terminals of the transmission line and current control terminals 29*a*, 29*b* coupled in series with the d.c. control coils.

Figure 3:
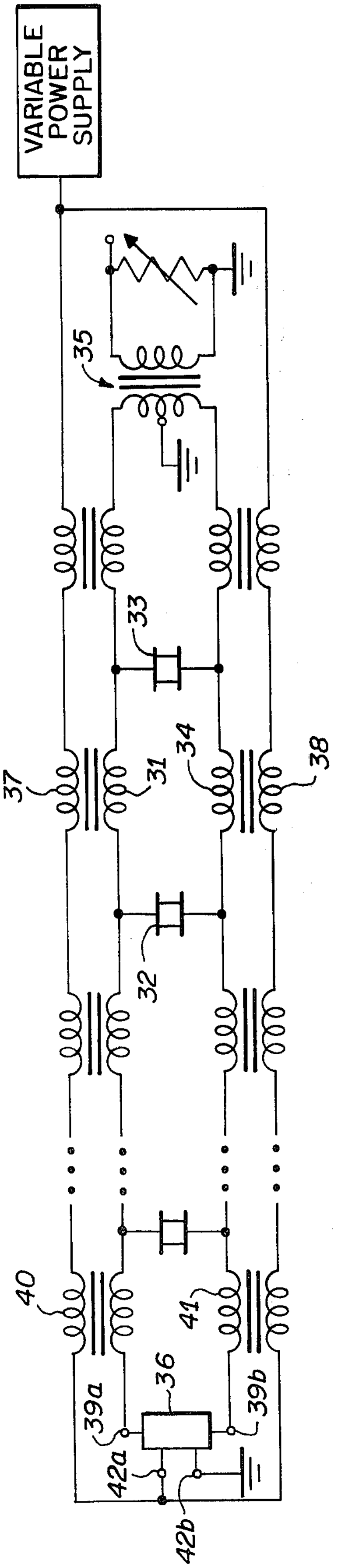
FIG. 3 is a schematic diagram of a balanced artificial transmission line with variable propagation velocity's and a characteristic impedance tracking termination.

The need for perfectly balanced reverse windings in each section of the artificial transmission line may be alleviated with the use of the balanced artificial transmission line shown in FIG. 3. This type of line may be constructed by coupling inductances between the shunt capacitors on either side of the capacitor such as the inductor 31 coupled between one side of the capacitors 32, 33 and the inductor 34 coupled between the other side of the capacitors 32, 33. The inductors 31, 34 each have a value that is equal to one half of the value of the inductance for that section, being substantially equal to L/2 for internal sections and L/4 for the end sections. The line is fed by a center tapped transformer 35 at the input end and is terminated with an impedance 36 in a manner similar to the termination of the unbalanced line. For this line, inductances are varied with d.c. current carrying coils, as for example coils 37 and 38, that are wound in the same direction about the iron core of the transmission line coil. A current variable impedance 36 may be coupled via terminals 39*a*, 39*b* to the end section coils 40, 41, while the control terminals 42*a*, 42*b* may be coupled in series relationship with the control coils such as 37 and 38.

Power loss and reflections on a transmission line are caused by mismatched terminations, i.e. terminations having impedance values not equal to the characteristic impedance of the transmission line. In the transmission line type sonar array described above, these reflections create an ambiguity by establishing a secondary beam positioned symmetrically about the array axis with the primary beam. As stated previously, the characteristic impedance $Z_o$ of an artificial transmission line is a function of the series inductance and the shunt capacitance, being determined from the equation $$Z_o = L/C\left(1 - \frac{W^2LC}{4}\right).$$

Since the phase constant of the transmission line is altered by maintaining the shunt capacitance constant and varying the series inductance, the characteristic impedance of the line varies with beam position. Termination impedance variation may be accomplished with the application of a d.c. current to an appropriate circuit, as will be described subsequently. By coupling the control terminals, 29*a*, 29*b* in FIG. 2 and 42*a*, 42*b* in FIG. 3, of the termination in series with the control coils and coupling the impedance terminals, 30*a*, 30*b* in FIG. 2 and 39*a*, 39*b* in FIG. 3, to the transmission line, the same d.c. current used to steer the sonar beam may be employed to provide substantially matched terminations.

Figure 4:
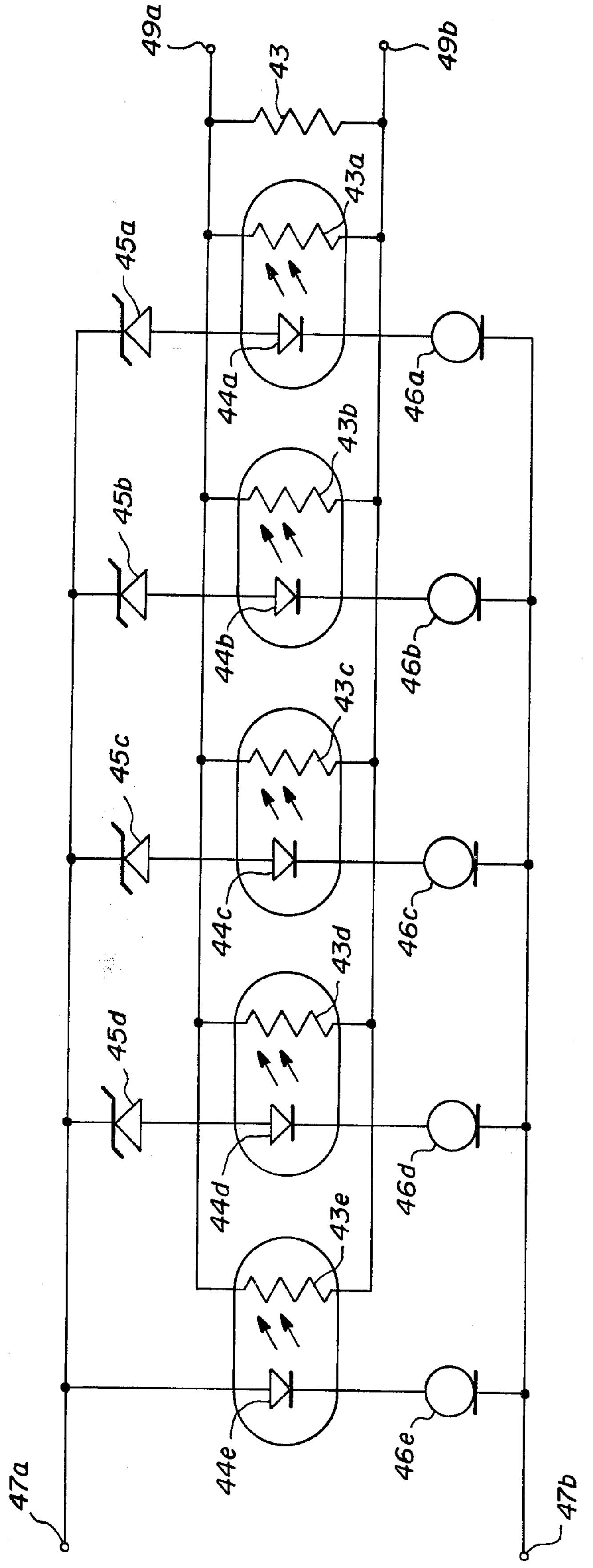
FIG. 4 is a schematic diagram of a characteristic impedance tracking termination for the artificial transmission lines of FIGS. 2 and 3.

Refer now to FIG. 4 wherein a schematic diagram of a d.c. current variable resistance suitable as a termination for the artificial transmission is shown. A fixed resistor 43 may be coupled in parallel with a plurality of light sensitive resistors 43*a* through 43*e*, each of which are correspondingly light coupled to light emitting diodes (LED) 44*a* through 44*e*. The LED-resistor combination may be of the type known as VACTROL manufactured by Vactec Inc. of St. Louis, Missouri. The LED's 44*a* through 44*d* are coupled in series relationship with voltage regulator diodes 45*a* through 45*d* and constant current diodes 46*a* through 46*d* while LED 44*e* is coupled in series with constant current diode 46*c*. These series circuits are coupled between terminals 47*a*, 47*b*, corresponding to the control terminals 29a, 29b in FIG. 2, and 42a, 42b in FIG. 3. At zero control d.c. current LED's 44a through 44e do not emit light. This causes light sensitive resistors 43a through 43e to present resistance values very much greater than the value of the fixed resistor 43. Thus, the parallel combination of the light sensitive resistors and the fixed resistance 43 present a line termination that is substantially equal to the value of resistor 43. Consequently, the value of the fixed resistor 43 is substantially equal to characteristic impedance of the artificial transmission line prevailing for the beam correspondence to a zero control d.c. current. The control current may be increased in steps of predetermined current values to sequentially cause diodes 45a through 45d to conduct, as a consequence thereof causing LEDS 44a through 44e to emit light. Thus the resistance values of the corresponding photo resistors are lowered and the resistance value appearing between terminal 49a, 49b is step decreased in accordance with each resistance added to the parallel combination. As each LED turns on, its current is kept constant by the constant current diode in series therewith. This stabilizes the value of the resistance at terminals 49a, 49b with each step in d.c. control current, establishing reproducable terminating impedances for each beam position. It will be recognized by those skilled in the art that the resistance range may be increased or decreased by increasing or decreasing the number of VACTROL units in the termination.

Figure 5:
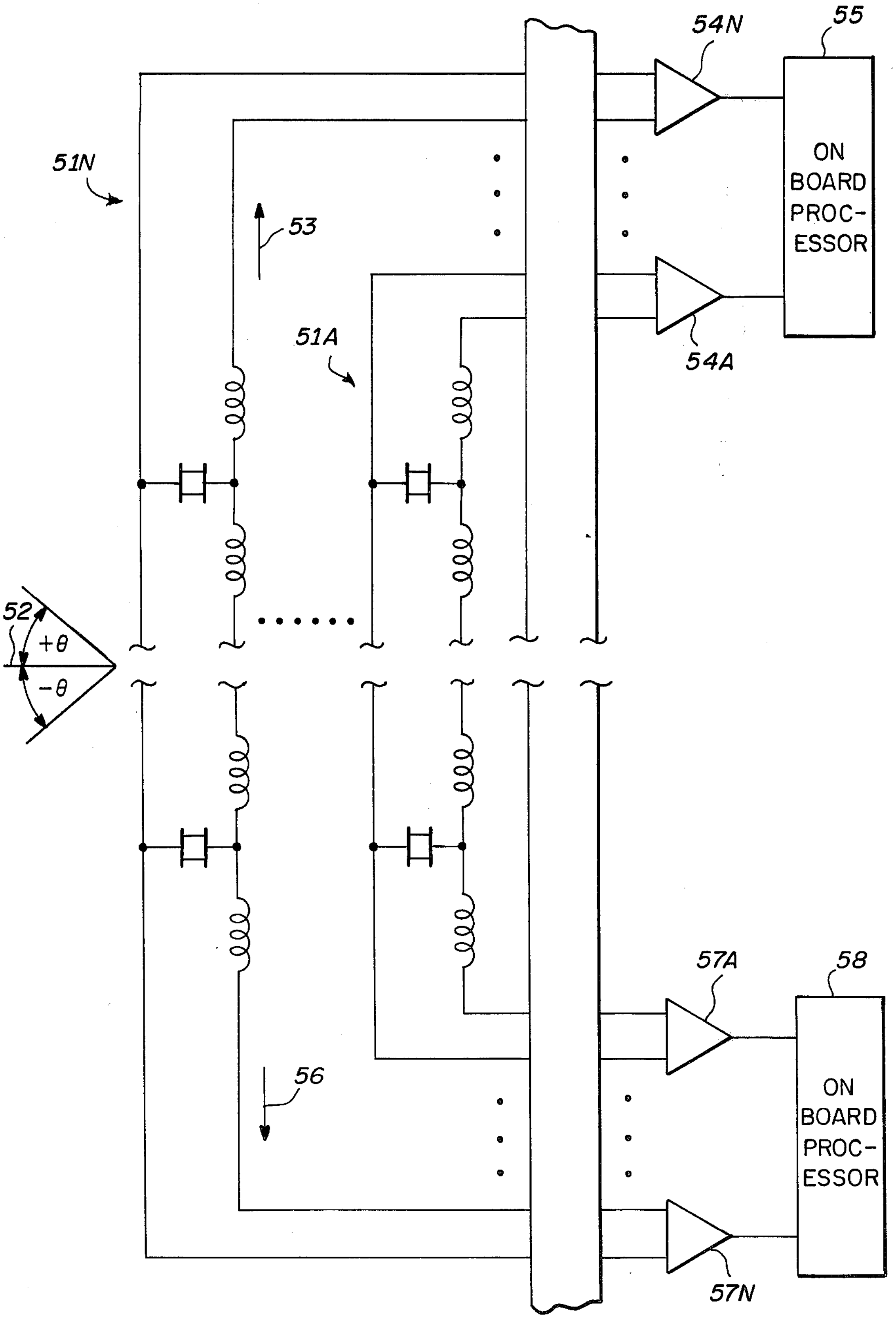
FIG. 5 is a schematic diagram of a sonar array having twin beams simultaneously steerable in accordance with the principles of the present invention.

Since the received signals propagate along the transmission line in both propagation directions, two beams, symmetrically positioned about the axis of the array, are formed, and both can be utilized if connections through the hull are made at both ends of the line. A schematic diagram of such a system is shown in FIG. 5. Each line array 51A through 51N provides two beams, symmetrically positioned about the axis 52 at angles of $\pm\theta$ which are determined from the relationship $$\sin\theta = \pm\frac{\beta}{k}.$$

Each of the lines 51A through 51N are constructed in a manner previously described. Signals coupled to the line propagating in the direction indicated by the arrow 53 may be coupled to amplifiers 54A through 54N to an onboard processor 55 wherein they may be processed to form a beam as described previously. Similarly, signals coupled to each line that propagate in the direction indicated by the arrow 56 may be coupled through amplifires 57A through 57N to an on-board processor 58 for processing.

While the invention has been described in its preferred embodiments, it is to be understood that the words that have been used are words of description rather than of limitation and that changes within the purview of the appended claims may be made without departing from the true scope and spirit of the invention in its broader aspects.

We claim:

1. An acoustic array system comprising:

means having first and second terminal means for providing sections of serially coupled electrical inductances each with an inductance value substantially equal to L;

transducer means for exchanging acoustic and electrical energy having sections with associated capacitance value substantially equal to C, said sections coupled to said sections of said inductance means to establish artificial electrical transmission line means having first and second terminal means corresponding to said first and second terminal means of said inductance means and having characteristic impedances $Z_o$ related to $\sqrt{L/C}$ and phase constants related to $\sqrt{LC}$; and means for coupling said first terminal means of said artificial transmission line means to signal processing means.

2. An acoustic array system in accordance with claim 1 further including means having impedances substantially equal to $Z_o$ coupled to said second terminal means for terminating said artificial transmission line means.

3. An acoustic array system in accordance with claim 2 wherein said inductance means comprises:

core means for providing flux density in accordance with applied d.c. magnetic fields; and first electrical conductor means wound about said core means to establish serially coupled electrical conductor sections for providing said serially coupled electrical inductances.

4. An acoustic array system in accordance with claim 3 further including second conductor means wound about said core means for conduction of d.c. current, said d.c. current variable to alter said flux density in said core means.

5. An acoustic array system in accordance with claims 3 or 4 wherein said terminating means is constructed and arranged such that said characteristic impedance $Z_o$ is variable in accordance with changes in said artificial transmission line characteristic impedance caused by changes in said d.c. current.

6. An acoustic array system in accordance with claim 5 wherein said terminating impedance includes:

a fixed impedance of value substantially equal to said artificial transmission line characteristic impedance when said d.c. current is substantially equal to zero; and means coupled in parallel relationship with said fixed impedance and coupled to receive said d.c. current for providing an impedance variable in accordance with magnitudes of said d.c. current.

7. An acoustic array system in accordance with claim 1 further including means coupled to said second terminal means of said artificial transmission line means for processing electrical signals.

8. An acoustic array system in accordance with claim 7 wherein said inductance means comprises:

core means for providing flux density in accordance with applied d.c. magnetic fields; and first electrical conductor means wound about said core means for conduction of electrical current.

9. An acoustic array system in accordance with claim 8 further including second conductor means wound about said core means for conduction of d.c. current, said d.c. current variable to alter said flux density in said core means.

* * * * *